(12) United States Patent
Moyer et al.

(10) Patent No.: US 9,563,494 B2
(45) Date of Patent: Feb. 7, 2017

(54) SYSTEMS AND METHODS FOR MANAGING TASK WATCHDOG STATUS REGISTER ENTRIES

(71) Applicant: FREESCALE SEMICONDUCTOR, INC., Austin, TX (US)

(72) Inventors: William C. Moyer, Dripping Springs, TX (US); Michael Kardonik, Austin, TX (US)

(73) Assignee: NXP USA, Inc., Austin, TX (US)

( * ) Notice: Subject to any disclaimer, the term of this patent is extended or adjusted under 35 U.S.C. 154(b) by 87 days.

(21) Appl. No.: 14/673,373

(22) Filed: Mar. 30, 2015

(65) Prior Publication Data

US 2016/0292027 A1    Oct. 6, 2016

(51) Int. Cl.
 *G06F 11/00* (2006.01)
 *G06F 11/07* (2006.01)
 *G06F 9/46* (2006.01)

(52) U.S. Cl.
 CPC ............ *G06F 11/0757* (2013.01); *G06F 9/46* (2013.01); *G06F 11/0715* (2013.01); *G06F 11/0724* (2013.01)

(58) Field of Classification Search
 CPC ........................ G06F 11/0754; G06F 11/0757
 USPC .......................................................... 714/55
 See application file for complete search history.

(56) References Cited

U.S. PATENT DOCUMENTS

| | | | |
|---|---|---|---|
| 4,727,549 A * | 2/1988 | Tulpule ............... | G06F 11/0721 714/55 |
| 4,796,211 A * | 1/1989 | Yokouchi ............ | G06F 11/0757 714/55 |
| 5,402,381 A | 3/1995 | Sonobe et al. | |
| 5,542,051 A * | 7/1996 | Sugita ................ | G06F 11/0757 714/51 |
| 5,623,357 A | 4/1997 | Kight et al. | |
| 5,655,135 A | 8/1997 | Sholander et al. | |
| 6,594,736 B1 | 7/2003 | Parks | |
| 7,389,496 B2 | 6/2008 | Eckhart et al. | |
| 7,721,083 B2 * | 5/2010 | Ikedo ................... | G06F 9/4403 713/1 |
| 8,200,799 B2 | 6/2012 | Scheuermann et al. | |
| 8,261,134 B2 | 9/2012 | Abts et al. | |
| 8,281,022 B1 | 10/2012 | Bopardikar et al. | |
| 8,397,005 B2 | 3/2013 | Andersson et al. | |
| 2005/0188274 A1 | 8/2005 | Vedam et al. | |
| 2012/0167082 A1 | 6/2012 | Kumar et al. | |
| 2012/0221884 A1 | 8/2012 | Carter et al. | |

FOREIGN PATENT DOCUMENTS

GB    WO 2014001758 A1 *    1/2014    .......... G06F 11/0757

* cited by examiner

*Primary Examiner* — Joseph Kudirka

(57) ABSTRACT

The present disclosure provides system and method embodiments for a status register comprising a plurality of bits, where each of the plurality of bits of the status register is associated with one of a plurality of entities. A trigger mechanism is configured to write a trigger data pattern to the status register, where the trigger data pattern comprises a first state value for each of the plurality of bits of the status register. A capture mechanism is configured to write a second state value to each bit of the status register that is associated with an entity that is presently associated with a first type of entity status information, in response to a detection that the trigger data pattern is written to the status register.

20 Claims, 5 Drawing Sheets

SYSTEMS AND METHODS FOR MANAGING TASK WATCHDOG STATUS REGISTER ENTRIES

FIELD OF THE DISCLOSURE

This disclosure generally relates to data processing, and more particularly to systems and methods for managing task watchdog status register entries in a data processing system.

BACKGROUND

In the field of the embedded applications, correct behavior of a microcontroller typically depends, inter alia, upon a timely response to an external stimulus. Indeed, failure by the microcontroller to respond to an event within an expected time frame can result in serious malfunction of a system that is under the control of the microcontroller. In this respect, response time of the microcontroller is dependent upon hardware and software design and can be an extremely complex value to predict.

Hence, for some embedded applications, a maximum time limit is typically attributed to a given external stimulus, and failure by the microcontroller in some circumstances to respond to the given external stimulus within the maximum time limit results in incorrect performance of the system. In such circumstances, it is desirable to place the microcontroller in a known "safe" state. In other circumstances, failure by the microcontroller to respond to the external stimulus within the maximum time limit can result in the external stimulus becoming invalid after expiration of the maximum time limit. Consequently, providing a response to the external stimulus that is no longer valid can also cause the system to behave incorrectly.

In order to overcome such problems described above, it is known to design microcontrollers with additional external watchdog functions or elaborate internal software defensive measures to detect and report timeout events. Once a timeout event is detected, corrective action can be taken to avoid incorrect performance of the system.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Embodiments of data processing systems and methods are disclosed that include a task watchdog timer that communicates with a hardware core task scheduler (CTS), and uses a periodic software watchdog task to capture information regarding the identity of currently active tasks. Task watchdog time-outs are detected by software when a task remains active over an interval of two instances of the software watchdog task being spawned. Unlike traditional watchdog timers, no separate watchdog timer is implemented for individual tasks. Instead a centralized Task Watchdog Status (TWS) register is provided, which the software watchdog task uses to capture the identity of all currently active tasks in a processor. The software watchdog task is periodically initiated at time intervals of long duration relative to the maximal expected lifetime of a task. In an advanced I/O processor (ATOP) system, tasks are expected to complete in timeframes measured in thousands of cycles, due to the nature of the processing activity they are performing. Task state information is communicated to the time-out mechanism by individual task state tracker (TST) state machines located in the CTS. When a task completes, the task returns to an Unassigned state, which causes the TST to clear a bit corresponding to the task in the TWS register. In normal operation, bits in the TWS register corresponding to currently active tasks are set to a predetermined value (e.g. '1') when a strobe generated when the watchdog task clears the TWS register is detected by the TST. As a task completes, and returns to the Unassigned state, the completing task's bit in the TWS register is cleared by the TST.

Figure 1:
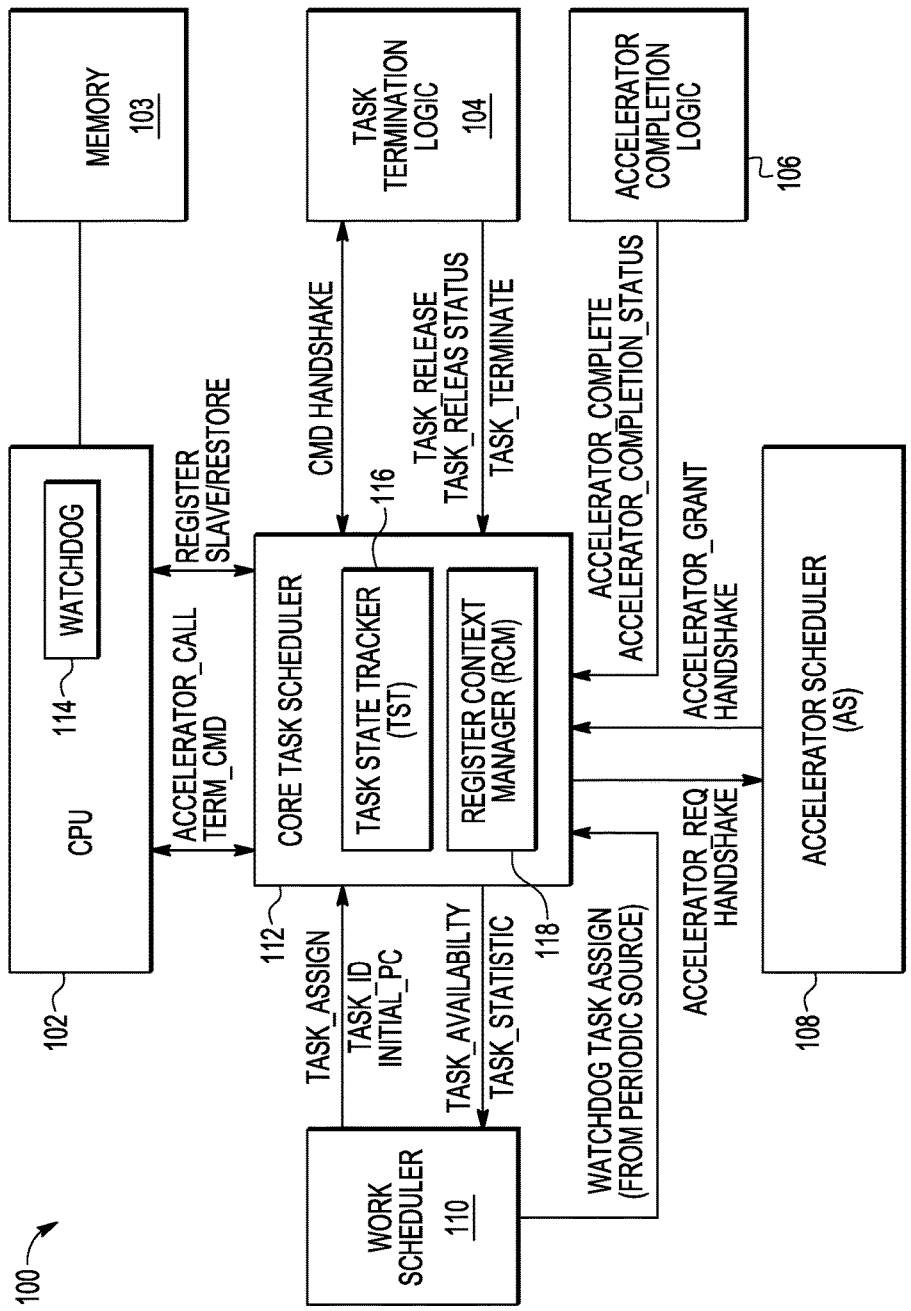
FIG. 1 illustrates a data processing system in accordance with at least one embodiment of the present disclosure.

FIG. 1 shows a data processing system 100 in accordance with at least one embodiment of the present disclosure. The data processing system 100 includes one or more central processor units (CPU) 102, one or more memory devices 103, task termination logic 104, accelerator completion logic 106, accelerator scheduler 108, work scheduler 110 and core task scheduler 112. Processing system can also include other components that are not shown such as an input/output module, network interface logic, an internal bus to communicate between components within processing system 100 and an external bus to interface with peripherals outside of processing system 100.

Components such as CPU 102, task termination logic 104, accelerator completion logic 106, accelerator scheduler 108, work scheduler 110 and core task scheduler 112 can be implemented using a general purpose processor, special purpose processors, state machines, and/or other types of logic circuits capable of performing logic operations.

CPU 102 can communicate with other CPUs, and can store data to or receive data from memory device 103. The processor 102 can also receive and send data packets from/to other devices via an input/output module. The input/output module classifies received data packets and provides the packets to a queue manager, which in turn stores the data packet in a queue. During classification, the input/output module can evaluate header information of a received data packet to determine a program to process the packet and to assign to the packet data a particular program ID identifying the program. Examples of various programs that can execute on a data packet include decryption, de-compression, compression, among others. The queue manager can create/remove queues to store the data packets based on the number of packet streams received at the processor. Thus, upon classification, the data packet is assigned to an existing queue for that particular data stream, or a new queue is created to which the data packet is assigned.

After data packets are placed in a queue, the work scheduler 110 can assign each of the data packets, on a packet-by-packet basis, and a corresponding program to a task that is in turn assigned to a CPU 102. The work scheduler 110 can provide task specific information to core task scheduler 112, such as task assignment, task identifier, and an initial program counter. Core task scheduler 112 can provide information such as task availability and task statistics to work scheduler 110. Work scheduler 110 can also provide a watchdog task assignment to core task scheduler 112 at regular time intervals, whose primary function is to determine whether any of the previously assigned tasks have timed out.

Work scheduler 110 can assign a task to a CPU 102 based on the software needed to perform the task, the availability of CPU 102, and the like. The work scheduler 110 can continue defining and assigning tasks until no more data packets remain unassigned or until all task table entries of CPU 102 are full, e.g., all available tasks have been assigned. In an embodiment, each CPU 102 can have up to sixteen tasks assigned.

Core task scheduler 112 communicates with CPU 102, task termination logic 104, accelerator completion logic 106, accelerator scheduler 108, and work scheduler 110 to schedule tasks for execution based on task age/priority and readiness to run. Execution of the tasks can be interleaved on CPU 102, with scheduling decisions made by core task scheduler 112, based on task acceleration request status and task ordering scope constraints. Core task scheduler 112 also initializes context registers for newly initiated tasks requested by work scheduler 110, providing initial values for general purpose registers, program counter, stack pointer, data areas, and stack limit check values, among others.

Core task scheduler 112 also includes task state tracker 116 and register context manager 118. Task state tracker 116 coordinates new task initiation, task scheduling, and hardware accelerator request/completion operations. Register context manager 118 performs register context save/restore operations between background and foreground register files in CPU 102. Register context manager 118 saves each task's register context when the task is temporarily suspended (task yields), and restores each task's register context when the task is rescheduled for execution by core task scheduler 112.

Task termination logic 104 may terminate a task under various circumstances, for example, by an accelerator upon completion of a direct memory access, or by a request from CPU 102 to terminate the task via an explicit task termination command. When a task termination actually occurs within the core task scheduler 112, an indication is made that the task has returned to the unassigned state, and task lifetime information, is provided to work scheduler 110.

Accelerator scheduler 108 receives accelerator requests from CPU 102 via core task scheduler 112 and returns an indication of whether the accelerator request will be granted to core task scheduler 112. Acceleration completion logic 106 returns an indication of whether the task executed by an accelerator has completed, and the status of the completed task, e.g., successful or unsuccessful completion.

Figure 2:
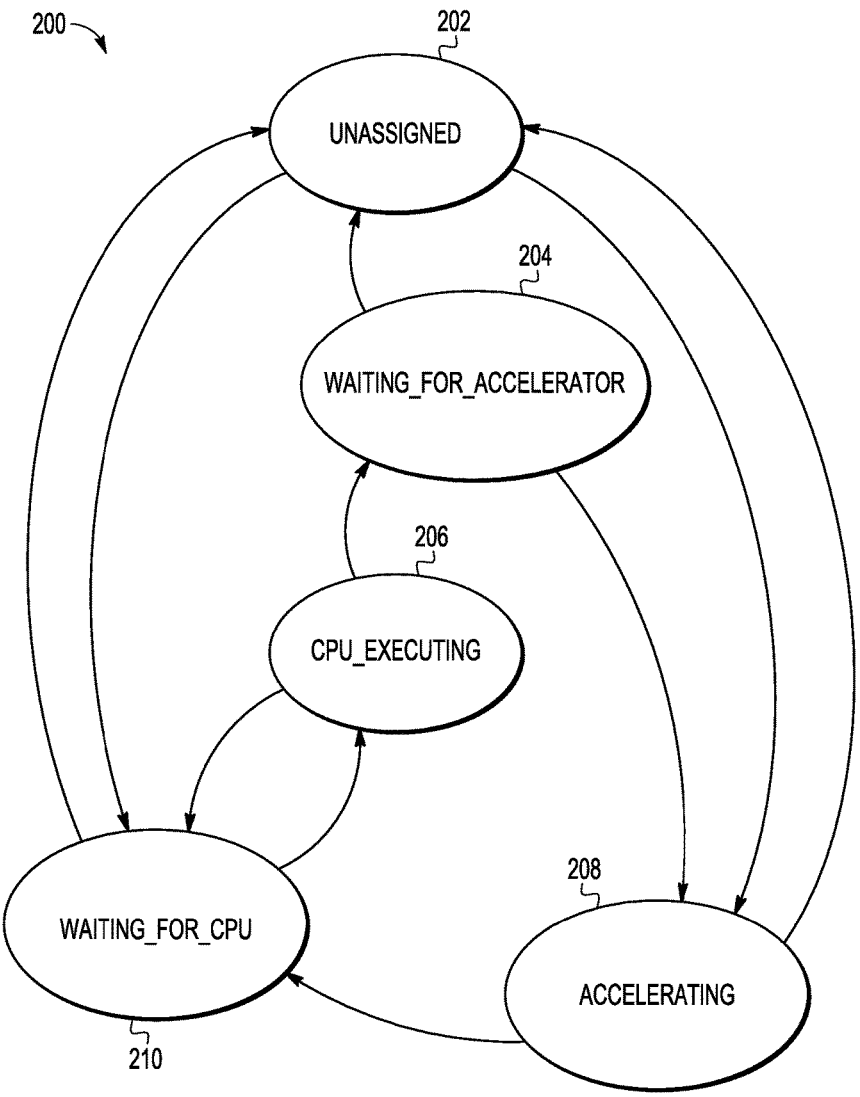
FIG. 2 illustrates a state diagram for tasks executing in the data processing system of FIG. 1.

Referring to FIGS. 1 and 2, FIG. 2 illustrates a state diagram 200 for tasks executing in the data processing system 100 that can be used by task state tracker 116 of FIG. 1. A task can exist in one of several states including unassigned state 202, waiting for accelerator state 204, CPU executing state 206, accelerating state 208, and waiting for CPU state 210. A task can make the following transitions:

from the unassigned state 202 to the waiting for CPU state 210;

from the unassigned state 202 to the accelerating state 208;

to the unassigned state 202 from the waiting for CPU state 210;

to the unassigned state 202 from the accelerating state 208;

from the waiting for CPU state 210 to the CPU executing state 206;

from the CPU executing state 206 to the waiting for CPU state 210;

from the CPU executing state 206 to the waiting for accelerator state 204;

from the accelerating state 208 to the waiting for CPU state 210;

from the waiting for accelerator state 204 to the unassigned state 202; and from the waiting for accelerator state 204 to the accelerating state 208.

Transitions between states 202-210 are controlled by core task scheduler 112 based on the availability of processing components such as CPU 102 and accelerators (not shown) in system 100 of FIG. 1, and the stage of execution of a task.

Figure 3:
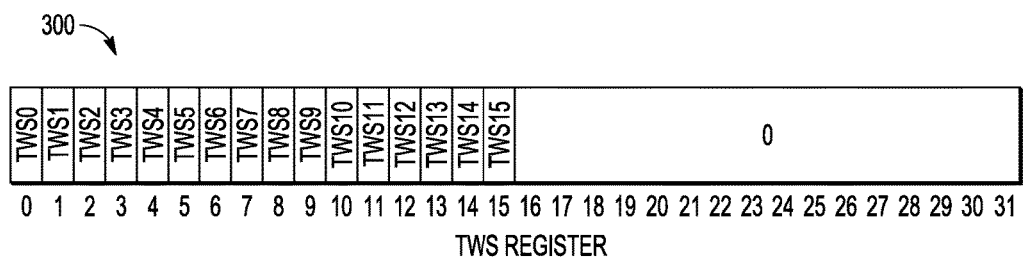
FIG. 3 illustrates a task watchdog status register that can be used in the processing system of FIG. 1.

Referring to FIGS. 1 and 3, FIG. 3 illustrates a task watchdog status (TWS) register 300 that can be used in the processing system 100 of FIG. 1. TWS register 300 includes one bit for each of a possible number of tasks that can run at one time in CPU 102. In the example shown, TWS register 300 includes sixteen bits for sixteen possible tasks. The status of each bit is checked at regular time intervals by watchdog logic 114 in CPU 102. Task state information is communicated to a time-out mechanism in core task scheduler 112 by individual task state tracker (TST) state machines 200 (FIG. 2) located in core task scheduler 112. When a task completes, the task returns to unassigned state 202, which causes logic associated with TWS register 300 to clear a corresponding bit in TWS register 300. Additionally, bits in TWS register 300 corresponding to tasks being executed can be set (updated with current status) in response to all of the bits being written with a data pattern of all 0's by watchdog task 114, as further described herein. The logic for setting bits for tasks being executed and clear bits for tasks that complete execution can be implemented in hardware associated with TWS register 300 or by other suitable means.

Figure 4:
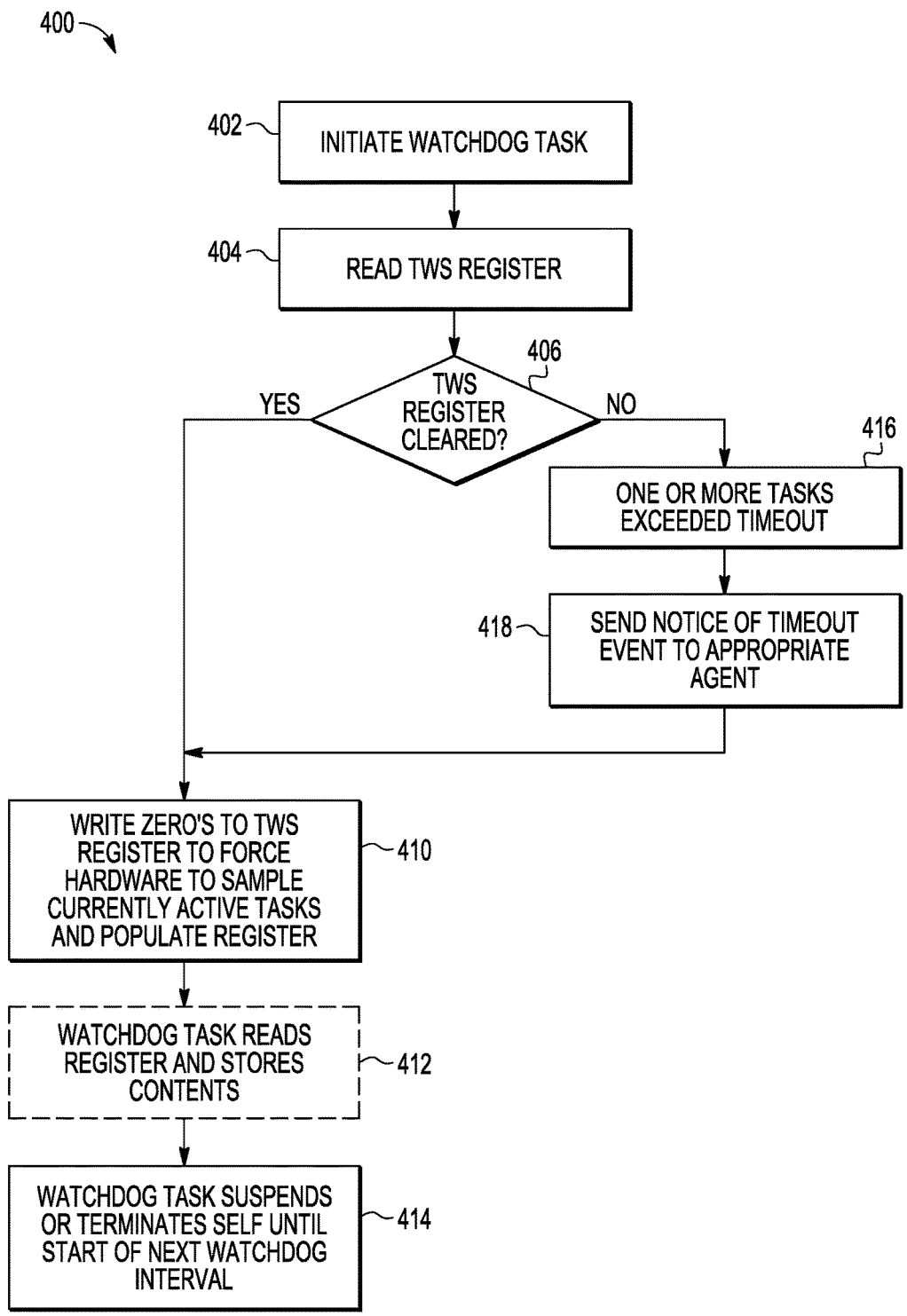
FIG. 4 illustrates a flow diagram of a method for managing contents of a task watchdog status register that can be executed by a watchdog task in the data processing system of FIG. 1 in accordance with at least one embodiment of the present disclosure.

FIG. 4 illustrates a flow diagram of a method 400 for managing contents of TWS register 300 (FIG. 3) that can be executed by watchdog task 114 in the data processing system 100 of FIG. 1 in accordance with at least one embodiment of the present disclosure. The watchdog task 114 initiates operation in process 402 and reads the status of bits in the TWS register 300 in process 404.

Process 406 determines whether all the bits in the TWS register 300 are cleared. Hardware associated with TWS register 300 can be configured to clear a bit in TWS register 300 when a corresponding task returns to the unassigned state. If no tasks are in timed-out status, all the bits in TWS register 300 will be read as 0. The hardware associated with TWS register 300 can also be configured to sample all tasks currently being executed.

If all bits in TWS register 300 are read as 0 when the watchdog task 114 reads the status of bits in the TWS register 300 in process 404, process 410 writes all zero's to TWS register 300 to force hardware to sample currently active tasks and populate TWS register 300. Note that this special "write 0's to sample operation does not actually force a write of a value of all zeros to occur, but instead, indicates to hardware that the TWS register 300 should be updated with the identities of all currently active tasks, i.e., a sampling of active tasks is to be performed, and the result is the actual value with which TWS register 300 is written to.

If all of the bits in TWS register 300 are not cleared when the watchdog task 114 reads the status of bits in the TWS register 300 in process 404, process 406 transitions to process 416 to determine that one or more tasks exceeded timeout. Process 418 sends notice of timeout event to an appropriate agent and transitions to process 410 to write zero's to TWS register 300 to force hardware to sample currently active tasks and populate TWS register 300 with the status of which tasks are currently active.

Process 410 can then optionally transition to process 412, in which the watchdog task reads TWS register 300 and stores contents for the next invocation of method 400. In process 414, the watchdog task suspends or terminated itself until the start of the next watchdog interval.

Figure 5:
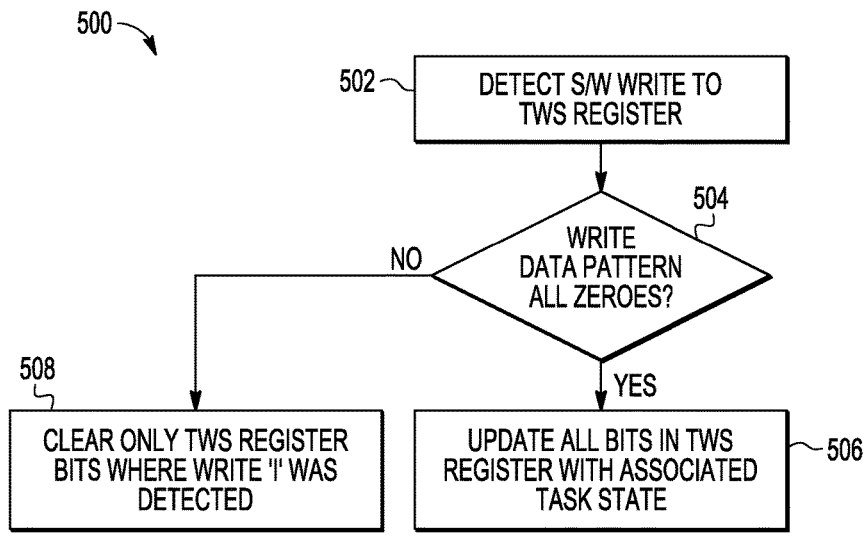
FIG. 5 illustrates a flow diagram of a method for managing contents of a task watchdog status register that can be executed by the watchdog register in the data processing system of FIG. 1 in accordance with at least one embodiment of the present disclosure.

FIG. 5 illustrates a flow diagram of a method 500 for managing contents of a TWS register 300 that can be executed by the watchdog task 114 in the data processing system 100 of FIG. 1 in accordance with at least one embodiment of the present disclosure. If a software task writes to TWS register 300 with write data of all zeros, the hardware can cause bits in TWS register to be set for each corresponding active task that is currently not in the Unassigned state. In process 502, a software write to TWS register 300 is detected. Process 504 determines whether a data pattern of all zeroes is written. If so, process 506 updates all bits in TWS register 300 with the associated task states. If the write pattern was not all zeroes, process 508 clears only TWS register bits where a write '1' was detected. Method 500 allows software to "prime" the bits in TWS register 300 for later inspection to determine if any existing task at the time of this special write is still active at a later point in time. These bits are "write '1' to clear" by either task software or task watchdog software. In addition, a special setting of selected bits corresponding to currently assigned tasks will occur when software writes a value of all zeros to TWS register 300. The bits cannot directly be set to '1' by a software write, however.

Figure 6:
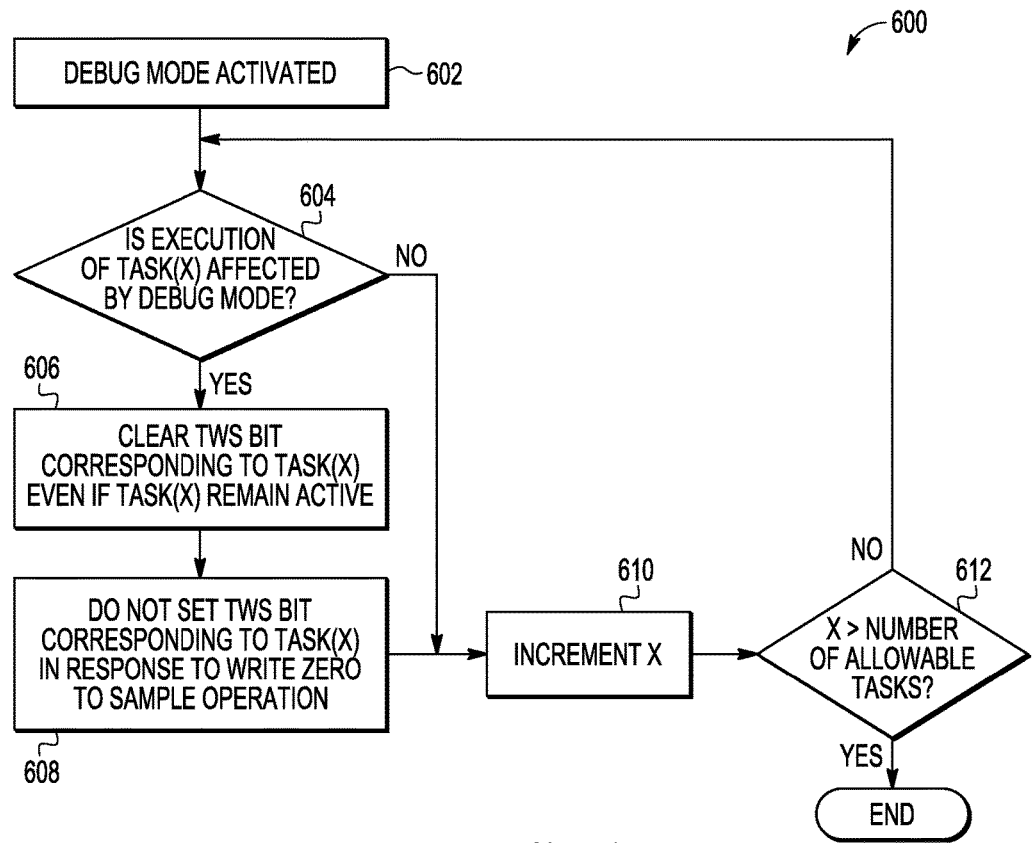
FIG. 6 illustrates a flow diagram of a method for managing contents of a task watchdog status register that can be executed during debug mode in the data processing system of FIG. 1 in accordance with at least one embodiment of the present disclosure.

FIG. 6 illustrates a flow diagram of a method 600 for managing contents of a task watchdog status register that can be executed during debug mode in the data processing system 100 of FIG. 1 in accordance with at least one embodiment of the present disclosure. If a debug mode is activated and the data processor stops processing of one or more tasks in response to the debug mode, the corresponding task watchdog status bits by can be cleared by hardware such that the tasks affected by debug do not cause a watchdog time-out condition. Process 602 detects activation of a debug mode. Process 604 then determines whether execution of a task(x) is being affected by the debug mode, where 'x' is an index into the array or list of tasks. This condition may be met when the debugger halts execution of task(x) so register contents or other parameters may be inspected or to trace the path of instructions. If the task(x) is affected by the debug mode, process 606 includes clearing a TWS bit corresponding to task(x) by hardware even if task(x) remains in the active state. Process 608 then prohibits setting the bit corresponding to task(x) by hardware in response to a 'write zero to sample' operation performed by software. Process 610 increments the task index 'x' and process 612 determines whether index 'x' is greater than the allowable number of tasks. If so, process 612 ends method 600. Otherwise, process 612 transitions back to process 604 to determine whether execution of task(x) is affected by the debug mode. Note that if process 604 determines that task(x) is not affected by the debug mode, process 604 transitions to process 610 to increment index 'x', which then transitions to process 612. Processes 604 through 612 are performed until all tasks have been checked to determine whether they are affected by the debug mode.

Figure 7:
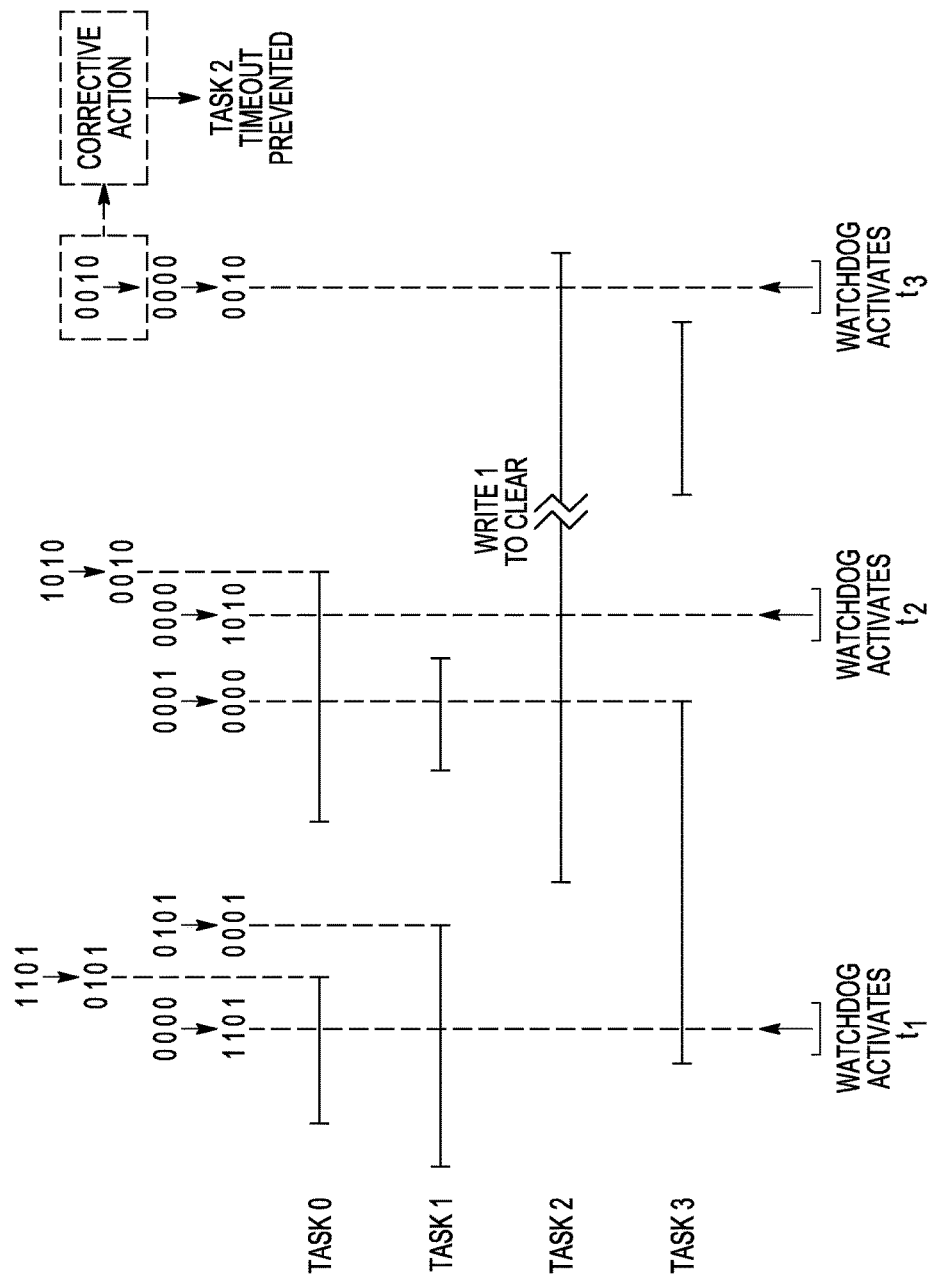
FIG. 7 illustrates a time history diagram of contents of a task watchdog register at various stages execution of four separate tasks in the data processing system of FIG. 1 in accordance with at least one embodiment of the present disclosure.

FIG. 7 illustrates a time history diagram showing contents of TWS register 300 at various stages execution of four separate tasks in the data processing system 100 of FIG. 1 in accordance with at least one embodiment of the present disclosure. When the watchdog tasks is spawned at time t1, Tasks 0, 1, and 3 are active and task 2 is not active. The task bits of TWS register 300 are set from 0000 to 1101. When Task 0 ends, the task bits of TWS register 300 are set to 0101. When Task 1 ends, the task bits of TWS register 300 are set to 0001. When Task 3 ends, Tasks 0, 1 and 2 are executing, but the watchdog task is not scheduled to be spawned again until a later time t2. Accordingly, the task bits of TWS register 300 are set to 0000.

At time t2, the watchdog tasks is spawned and Tasks 0 and 2 are active, so the task bits of TWS register 300 are set from 0000 to 1010 when a "write 0's to sample' operation is subsequently performed by the watchdog task. When Task 0 ends, the task bits of TWS register 300 are set to 0010 since Task 2 is still active.

Task watchdog time-outs are detected by software when a task remains active over an interval of two instances of the software watchdog task being spawned. A software task has the ability to extend its lifetime by clearing its specific status bit in the TWS register 300 in cases where the task needs to exceed its normal execution interval allowance. This is indicated as "Write '1' to clear" in the timeline of Task 2 between time t2 and t3 in FIG. 7. At time t3, the watchdog task is spawned, and the bits in TWS register are read out as 0000 due to the "Write 1 to clear" operation that was previously performed by task 2. The bits in TWS register are then set from 0000 to 0010 when a "write 0's to sample' operation is subsequently performed by the watchdog task, because task 2 is still executing.

Unlike traditional watchdog timers, no separate watchdog timer is implemented for individual tasks. Instead the centralized TWS register 300 is provided, which the software watchdog task uses to capture the identity of all currently active tasks in the CPU. The software watchdog task is periodically initiated using a timer tap of long duration with respect to the maximal expected lifetime of a task. In an AIOP system, tasks are expected to complete in timeframes measured in thousands of cycles, due to the nature of the processing activity they are performing. Task state information is communicated to the time-out mechanism by individual task state tracker (TST) state machines located in the CTS. When a task completes, it returns to the Unassigned task state, which automatically clears a pending task bit in TWS register 300.

If tasks are behaving as expected, each time the software watchdog task runs, the current contents of the TWS register 300 is read as '0', indicating that all tasks which were active at the previous execution of the software WD task have completed within the expected interval (with margin). If a task's TWS bit is still set in TWS register 300 when the software watchdog task next runs, the contents of TWS register 300 indicate which task(s) was still active for the duration of a timer-strobe interval, and has thus timed-out.

By now it should be appreciated that in some embodiments, there has been provided a data processing system that can comprise one or more processors (102) each configured to execute a plurality of tasks, and one or more watchdog status registers (300) each comprising a plurality of bits. Each watchdog status register is associated with one of the processors, and each bit of the plurality of bits of one watchdog status register is associated with one task of the plurality of tasks of one processor that is associated with the one watchdog status register. A centralized watchdog task (114) can be configured to determine (406) whether every bit of the plurality of bits of a respective watchdog status register stores a first state value (all '0's), and write (410) a trigger data pattern to the respective watchdog status register, in response to a determination that every bit of the plurality of bits of the respective watchdog status register stores the first state value (all '0's indicate that all tasks completed/inactive at least once). The trigger data pattern can comprise the first state value for each of the plurality of bits (all '0's) of the respective watchdog status register; and one or more hardware logic circuits (112) each associated with a particular processor that is associated with a particular watchdog status register. Each hardware logic circuit can be configured to identify (506) a set of active tasks of the particular processor that are presently in an active task state (204-210), in response to a detection (504) that the trigger data pattern is written to the particular watchdog status register (all '0's triggers task sampling).

In another aspect, each hardware logic circuit can be further configured to write (506) a second state value ('1') to each bit of the particular watchdog status register that is associated with one of the set of active tasks, and the first state value ('0') remains in each bit of the particular watchdog status register that is not associated with one of the set of active tasks.

In another aspect, each hardware logic circuit can be further configured to detect that a particular task has a task state transition from the active task state (204-210) to an inactive task state (202), and write the second state value ('1') to a particular bit of the particular watchdog status register that is associated with the particular task to store the first state value ('0') in the particular bit (508), in response to detection of the task state transition.

In another aspect, the centralized watchdog task can be further configured to provide (418) an error notification in response to a determination that every bit of the plurality of bits does not store the first state value (at least one '1' is stored, meaning one or more tasks still active).

In another aspect, the error notification can comprise a task identifier of each task associated with each bit that does not store the first state value (bit stores a '1').

In another aspect, the centralized watchdog task can be further configured to write (410) the trigger data pattern to the respective watchdog status register, subsequent to the error notification.

In another aspect, each hardware logic circuit can be configured to identify the set of active tasks by being further configured to sample a plurality of present task state identifiers of the plurality of tasks of the particular processor, and determine whether a respective present task state identifier (ID) of a respective task does not match an inactive task state value. The respective task can be identified as one of the set of active tasks in response to a determination that the respective present task state ID does not match the inactive task state value.

In another aspect, the system can further comprise a watchdog task scheduler (on 110) configured to initiate (402) the centralized watchdog task in response to expiration of a time period. The time period has a duration longer than a maximum expected task lifetime, and the centralized watchdog task can be configured to terminate after the trigger data pattern is written to the watchdog status register (414).

In another aspect, each hardware logic circuit can be further configured to selectively clear (606) a particular bit of the particular watchdog status register in response to detection that a debugging mode is activated for a particular task associated with the particular bit.

In other embodiments, an integrated circuit can comprise a status register (300) comprising a plurality of bits, where each of the plurality of bits of the status register is associated with one of a plurality of entities, and a trigger mechanism (114) configured to write (410) a trigger data pattern to the status register, wherein the trigger data pattern comprises a first state value for each of the plurality of bits (all '0's) of the status register. A capture mechanism (112) can be configured to write (506) a second state value ('1') to each bit of the status register that is associated with an entity that is presently associated with a first type of entity status information, in response to a detection (504) that the trigger data pattern is written to the status register (all '0's triggers task sampling).

In another aspect, the integrated circuit can further comprise a clear mechanism configured to write the second state value ('1') to a particular bit of the status register to store the first state value ('0') in the particular bit.

In another aspect, the first state value can comprise a logic low value ('0'), and the second state value can comprise a logic high value ('1').

In still further embodiments, a method can comprise determining (406), by a centralized watchdog task (114) configured to execute on a processor (102), whether every bit of a plurality of bits of a watchdog status register stores a first state value (all '0's). Each bit of the plurality of bits is associated with one task of a plurality of tasks. The centralized watchdog task can write a trigger data pattern to the watchdog status register, in response to a determination that every bit of the plurality of bits stores the first state value (all '0's indicate that all tasks completed/inactive at least once). The trigger data pattern can comprise the first state value for each of the plurality of bits (all '0's). Hardware logic circuitry (112) can identify (506) a set of active tasks that are presently in an active task state (204-210), in response to a detection that the trigger data pattern is written to the watchdog status register (e.g., all '0's triggers task sampling).

In another aspect, the method can further comprise writing (506), by the hardware logic circuitry, a second state value ('1') to each bit of the watchdog status register that is associated with one of the set of active tasks. The first state value ('0') can remain in each bit of the watchdog status register that is not associated with one of the set of active tasks.

In another aspect, the method can further comprise detecting, by the hardware logic circuitry, that a particular task has a task state transition from the active task state (204-210) to an inactive task state (202); and writing, by the hardware logic circuitry, the second state value ('1') to a particular bit of the watchdog status register that is associated with the particular task to store the first state value ('0') in the particular bit, in response to detection of the task state transition.

In another aspect, the method can further comprise providing (418), by the centralized watchdog task, an error notification in response to a determination that every bit of the plurality of bits does not each store the first state value (at least one '1', one or more tasks still active). The error notification can comprise a task identifier of each task associated with each bit that does not store the first state value.

In another aspect, the method can further comprise writing (410), by the centralized watchdog task, the trigger data pattern to the watchdog status register, subsequent to the error notification.

In another aspect, identifying the set of active tasks can further comprise sampling a plurality of present task state identifiers of the plurality of tasks, and determining whether a respective present task state identifier (ID) of a respective task does not match an inactive task state value. The respective task can be identified as one of the set of active tasks in response to a determination that the respective present task state ID does not match the inactive task state value.

In another aspect, the method can further comprise initiating (402), by a watchdog task scheduler, the centralized watchdog task in response to expiration of a time period. The time period can have a duration longer than a maximum expected task lifetime, and the centralized watchdog task can be configured to terminate after the trigger data pattern is written to the watchdog status register (414).

In another aspect, the method can further comprise selectively clearing (606), by the hardware logic circuitry, a particular bit of the watchdog status register in response to a detection that a debugging mode is selected for a particular task associated with the particular bit.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. For example, memory may be located on a same CPU 102 or on a separate integrated circuit or located within another peripheral or slave discretely separate from other elements of system 100. Peripheral and I/O circuitry may also be located on separate integrated circuits or devices. Also for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising:
   one or more processors each configured to execute a plurality of tasks;
   one or more watchdog status registers each comprising a plurality of bits, wherein
      each watchdog status register is associated with one of the one or more processors, and
      each bit of the plurality of bits of one watchdog status register is associated with one task of the plurality of tasks of one processor that is associated with the one watchdog status register;
   a centralized watchdog task configured to
      determine whether every bit of the plurality of bits of a respective watchdog status register stores a first state value, and
      write a trigger data pattern to the respective watchdog status register, in response to a determination that every bit of the plurality of bits of the respective watchdog status register stores the first state value, wherein
         the trigger data pattern comprises the first state value for each of the plurality of bits of the respective watchdog status register; and
   one or more hardware logic circuits each associated with a particular processor that is associated with a particular watchdog status register, each hardware logic circuit configured to
      identify a set of active tasks of the particular processor that are presently in an active task state, in response to a detection that the trigger data pattern is written to the particular watchdog status register.

2. The data processing system of claim 1, wherein each hardware logic circuit is further configured to
   write a second state value to each bit of the particular watchdog status register that is associated with one of the set of active tasks, and
   the first state value remains in each bit of the particular watchdog status register that is not associated with one of the set of active tasks.

3. The data processing system of claim 2, wherein each hardware logic circuit is further configured to
   detect that a particular task has a task state transition from the active task state to an inactive task state, and
   write the second state value to a particular bit of the particular watchdog status register that is associated with the particular task to store the first state value in the particular bit, in response to detection of the task state transition.

4. The data processing system of claim 1, wherein the centralized watchdog task is further configured to
   provide an error notification in response to a determination that every bit of the plurality of bits does not store the first state value.

5. The data processing system of claim 4, wherein the error notification comprises a task identifier of each task associated with each bit that does not store the first state value.

6. The data processing system of claim 4, wherein the centralized watchdog task is further configured to
   write the trigger data pattern to the respective watchdog status register, subsequent to the error notification.

7. The data processing system of claim 1, wherein each hardware logic circuit is configured to identify the set of active tasks by being further configured to
   sample a plurality of present task state identifiers of the plurality of tasks of the particular processor, and
   determine whether a respective present task state identifier (ID) of a respective task does not match an inactive task state value, wherein
      the respective task is identified as one of the set of active tasks in response to a determination that the respective present task state ID does not match the inactive task state value.

8. The data processing system of claim 1, further comprising:
   a watchdog task scheduler configured to
      initiate the centralized watchdog task in response to expiration of a time period, wherein
         the time period has a duration longer than a maximum expected task lifetime, and
         the centralized watchdog task is configured to terminate after the trigger data pattern is written to the watchdog status register.

9. The data processing system of claim 1, wherein each hardware logic circuit is further configured to
   selectively clear a particular bit of the particular watchdog status register in response to detection that a debugging mode is activated for a particular task associated with the particular bit.

10. An integrated circuit comprising:
    a status register comprising a plurality of bits, wherein
       each of the plurality of bits of the status register is associated with one of a plurality of entities;
    a trigger mechanism configured to
       write a trigger data pattern to the status register in response to a determination that every bit of the plurality of bits stores a first state value, wherein
          the trigger data pattern comprises the first state value for each of the plurality of bits of the status register; and
    a capture mechanism configured to
       write a second state value to each bit of the status register that is associated with an entity that is presently associated with a first type of entity status information, in response to a detection that the trigger data pattern is written to the status register.

11. The integrated circuit of claim 10, further comprising a clear mechanism configured to
    write the second state value to a particular bit of the status register to store the first state value in the particular bit.

12. The integrated circuit of claim 11, wherein
the first state value comprises a logic low value, and
the second state value comprises a logic high value.

13. A method comprising:

determining, by a centralized watchdog task configured to execute on a processor, whether every bit of a plurality of bits of a watchdog status register stores a first state value, wherein each bit of the plurality of bits is associated with one task of a plurality of tasks;

writing, by the centralized watchdog task, a trigger data pattern to the watchdog status register, in response to a determination that every bit of the plurality of bits stores the first state value, wherein the trigger data pattern comprises the first state value for each of the plurality of bits; and identifying, by hardware logic circuitry, a set of active tasks that are presently in an active task state, in response to a detection that the trigger data pattern is written to the watchdog status register.

14. The method of claim 13, further comprising:

writing, by the hardware logic circuitry, a second state value to each bit of the watchdog status register that is associated with one of the set of active tasks, wherein the first state value remains in each bit of the watchdog status register that is not associated with one of the set of active tasks.

15. The method of claim 14, further comprising:

detecting, by the hardware logic circuitry, that a particular task has a task state transition from the active task state to an inactive task state; and writing, by the hardware logic circuitry, the second state value to a particular bit of the watchdog status register that is associated with the particular task to store the first state value in the particular bit, in response to detection of the task state transition.

16. The method of claim 13, further comprising:

providing, by the centralized watchdog task, an error notification in response to a determination that every bit of the plurality of bits does not each store the first state value, wherein the error notification comprises a task identifier of each task associated with each bit that does not store the first state value.

17. The method of claim 16, further comprising:

writing, by the centralized watchdog task, the trigger data pattern to the watchdog status register, subsequent to the error notification.

18. The method of claim 13, wherein the identifying the set of active tasks further comprises sampling a plurality of present task state identifiers of the plurality of tasks, and determining whether a respective present task state identifier (ID) of a respective task does not match an inactive task state value, wherein the respective task is identified as one of the set of active tasks in response to a determination that the respective present task state ID does not match the inactive task state value.

19. The method of claim 13, further comprising:

initiating, by a watchdog task scheduler, the centralized watchdog task in response to expiration of a time period, wherein the time period has a duration longer than a maximum expected task lifetime, and the centralized watchdog task is configured to terminate after the trigger data pattern is written to the watchdog status register.

20. The method of claim 13, further comprising:

selectively clearing, by the hardware logic circuitry, a particular bit of the watchdog status register in response to a detection that a debugging mode is selected for a particular task associated with the particular bit.

* * * * *